(12) United States Patent
Lin (10) Patent No.: US 10,049,091 B2
(45) Date of Patent: Aug. 14, 2018

(54) METHOD, DEVICE, AND TERMINAL EQUIPMENT FOR ENABLING INTELLIGENT ASSOCIATION IN INPUT METHOD

(71) Applicant: Tencent Technology (Shenzhen) Company Limited, Guagdong (CN)

(72) Inventor: Sen Lin, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 113 days.

(21) Appl. No.: 14/427,346

(22) PCT Filed: Sep. 4, 2013

(86) PCT No.: PCT/CN2013/082911
§ 371 (c)(1),
(2) Date: Mar. 11, 2015

(87) PCT Pub. No.: WO2014/040510
PCT Pub. Date: Mar. 20, 2014

(65) Prior Publication Data
US 2015/0248386 A1    Sep. 3, 2015

(30) Foreign Application Priority Data

Sep. 12, 2012 (CN) .......................... 2012 1 0337043

(51) Int. Cl.
*G06F 17/00*        (2006.01)
*G06F 17/24*        (2006.01)
(Continued)

(52) U.S. Cl.
CPC ............ *G06F 17/24* (2013.01); *G06F 3/0237* (2013.01); *G06F 3/04842* (2013.01);
(Continued)

(58) Field of Classification Search
CPC .............................. G06F 3/0237; G06F 17/276
See application file for complete search history.

(56) References Cited

U.S. PATENT DOCUMENTS 7,030,863 B2 * 4/2006 Longe .................. G06F 3/0237
345/172
7,293,231 B1 * 11/2007 Gunn .................... G06F 3/0236
345/179

(Continued)

FOREIGN PATENT DOCUMENTS

| CN | 101122901 A | 2/2008 |
|---|---|---|
| CN | 101248407 A | 8/2008 |
| CN | 101515205 A | 8/2009 |

OTHER PUBLICATIONS

Wang et al., "SHRIMP—Solving Collision and Out of Vocabulary Problems in Mobile Predictive Input with Motion Gesture" CHI 2010, Apr. 10-15, 2010, Atlanta, Georgia, USA. Copyright 2010 ACM, p. 15-24.*

(Continued)

*Primary Examiner* — Amelia Tapp
(74) *Attorney, Agent, or Firm* — Sughrue Mion, PLLC (57) ABSTRACT

A method, device, and terminal equipment for enabling intelligent association in input method are provided. Wherein, the method includes: receiving a currently inputted keyboard code; searching a word and/or a term associated with the keyboard code as candidate character in a preset lexicon, and calculating a weight of each candidate character; associating the word or the term selected by the lastly inputted keyboard with each candidate character as a combined key word, searching the combined key word in preset lexicon, and calculating a weight of the combined key word according to a search result; and updating the weight corresponding to the candidate character according to the weight of each combined key word, and displaying each candidate character according to the weight corresponding to the candidate character for user selection and confirmation.

20 Claims, 4 Drawing Sheets

(51) Int. Cl.
  *G06F 3/023* (2006.01)
  *G06F 17/22* (2006.01)
  *G06F 3/0484* (2013.01)
  *G06F 17/30* (2006.01)
  *G06F 17/27* (2006.01)

(52) U.S. Cl.
  CPC ........ *G06F 17/2223* (2013.01); *G06F 17/276* (2013.01); *G06F 17/3064* (2013.01); *G06F 17/30663* (2013.01)

(56) References Cited

U.S. PATENT DOCUMENTS

| | | | |
|---|---|---|---|
| 7,382,358 B2 * | 6/2008 | Kushler | G06F 3/0237 345/168 |
| 7,706,616 B2 * | 4/2010 | Kristensson | G06K 9/222 382/187 |
| 8,825,694 B2 * | 9/2014 | Samuelson | G06F 17/30873 707/767 |
| 9,471,566 B1 * | 10/2016 | Zhang | G06F 17/2863 |
| 2008/0103772 A1 * | 5/2008 | Bates | G06F 17/276 704/251 |
| 2008/0126075 A1 * | 5/2008 | Thorn | G06F 3/0237 704/3 |
| 2012/0141031 A1 * | 6/2012 | Boegelund | G06F 17/211 382/182 |
| 2013/0046544 A1 * | 2/2013 | Kay | G06F 3/04883 704/275 |
| 2016/0026258 A1 * | 1/2016 | Ou | G06F 17/276 715/773 |

OTHER PUBLICATIONS

International Search Report issued in corresponding International Application No. PCT/CN2013/082911, dated Dec. 2, 2013.

* cited by examiner

METHOD, DEVICE, AND TERMINAL EQUIPMENT FOR ENABLING INTELLIGENT ASSOCIATION IN INPUT METHOD

CROSS-REFERENCE TO RELATED APPLICATIONS

This present application claims the benefit of priority to Chinese Patent Application NO. 201210337043.X filed in Chinese Patent Office on Sep. 12, 2012 and entitled "METHOD, DEVICE, AND TERMINAL EQUIPMENT FOR ENABLING INTELLIGENT ASSOCIATION IN INPUT METHOD", the content of which is hereby incorporated by reference in its entirety for all intended purposes.

FIELD

The disclosure relates to a field of computer technology, and particularly to a method, a device and a terminal equipment for enabling intelligent association in input method.

BACKGROUND

Nowadays, input method in any kind of mobile phone, computer, or the like terminal equipments can use intelligent association, which can make association for currently inputted content in the form of speech, semanteme, etc. However, when the association is implemented, there may have a certain limitation to make association for the currently inputted content in the form of speech, semanteme, etc. Associated word, term or the like contents may have difference with the user real requirement for the content. Thus, hit rate of the association may be relatively low, and input speed of the character from a user may be decreased.

SUMMARY

Embodiments of the present disclosure provide a method, a device and a terminal equipment for enabling intelligent association in input method, in which the hit rate of the association can be improved, and the input speed of the character from a user can be increased.

According to one aspect of the present disclosure, a method for enabling intelligent association in input method is provided, in which the hit rate of the association can be improved.

The method includes the following steps of:
receiving a currently inputted keyboard code;
searching a word and/or a term associated with the keyboard code as a candidate character in a preset lexicon, and calculating a weight of each candidate character;
associating the word or the term selected by the lastly inputted keyboard code with each candidate character as a combined key word, searching the combined key word in the preset lexicon, and calculating a weight of the combined key word according to a search result; and
updating the weight corresponding to the candidate character according to the weight of each combined key word, and displaying each candidate character according to the weight corresponding to the candidate character for user selection and confirmation.

Wherein, the step of associating the word or the term selected by the lastly inputted keyboard code with each candidate character as a combined key word, searching the combined key word in the preset lexicon, and calculating a weight of the combined key word according to a search result includes steps of:
associating the word or the term selected by the lastly inputted keyboard code with each candidate character as a combined key word to search the combined key word in the preset lexicon;
calculating the weight of the combined key word being searched and matching a comparative data; and
assigning the weight of a combined key word being searched but not matching a comparative data to a preset basic value.

Wherein, the step of calculating the weight of the each candidate character means calculating to obtain the weight of each candidate character, according to a usage frequency of each candidate character; and
the step of calculating the weight of each combined key word means calculating to obtain the weight of each combined key word being searched and matching a comparative data, according to a usage frequency of the combined key word being searched and matching a comparative data.

Wherein, the step of updating the weight corresponding to the candidate character according to the weight of the each combined key word, and displaying each candidate character according to the weight corresponding to the candidate character for user selection and confirmation includes steps of:
updating the weights corresponding to the candidate characters according to the weight of each combined key word;
according to a descending order of the weights, ranking the candidate characters corresponding to the weights that have been updated; and
displaying the candidate characters that have been ranked.

Wherein, the method can further include steps of:
outputting a selection result of the user for the candidate character that is displayed, and storing the selection result in a context database to provide an association for the word and/or the term associated with a next inputted keyboard code.

Wherein, the step of receiving a currently inputted keyboard code includes steps of:
detecting the type of a currently inputted keyboard code;
if the currently inputted keyboard code is detected as a character keyboard code, executing the step of searching a word and/or a term associated with the keyboard code as a candidate character in a preset lexicon, and calculating a weight of each candidate character; and
if the currently inputted keyboard code is detected as an operation for input interruption control, deleting the word or the term stored in a context database and selected by the lastly inputted keyboard code.

Wherein, the step of receiving a currently inputted keyboard code includes step of:
after a user inputs a certain keyboard code and selects to obtain a corresponding word or term according to the keyboard code, temporarily storing the word or the term input by the user in a context database.

Wherein, the step of receiving a currently inputted keyboard code includes step of:
scanning the user inputted word or term before a cursor.

According to another aspect of the present disclosure, a device for enabling intelligent association in input method is provided, and includes:
a receiving module, configured to receive a currently inputted keyboard code;

a calculating module, configured to search a word and/or a term associated with the keyboard code as a candidate character in a preset lexicon, and calculate a weight of each candidate character;

a searching module, configured to associate the word or the term selected by the lastly inputted keyboard code with each candidate character as a combined key word, search the combined key word in the preset lexicon, and calculate a weight of the combined key word according to a search result;

an updating module, configured to update the weight corresponding to the candidate character according to the weight of each combined key word; and a displaying module, configured to display each candidate character according to the weight corresponding to the candidate character for user selection and confirmation.

Wherein, the searching module includes:

a searching unit, configured to associate the word or the term selected by the lastly inputted keyboard code with each candidate character as a combined key word to search the combined key word in the preset lexicon; and a determining unit, configured to calculate the weight of the combined key word being searched and matching a comparative data, and assign the weight of a combined key word being searched but not matching a comparative data to a preset basic value.

Wherein, the calculating module calculates to obtain the weight of each candidate character, according to a usage frequency of each candidate character; and the determining unit calculates to obtain the weight of each combined key word being searched and matching a comparative data, according to a usage frequency of the combined key word being searched and matching a comparative data.

Wherein, the device further includes:

a ranking module, configured to rank the candidate characters corresponding to the weights that have been updated by the updating module, according to a descending order of the weights;

wherein, the displaying module is configured to display the candidate characters that have been ranked by the ranking module.

Wherein, the device further includes:

an outputting module, configured to output a selection result of the user for the candidate character that is displayed, and store the selection result in a context database to provide an association for the word and/or the term associated with a next inputted keyboard code.

Wherein, the device further includes:

a detecting module, configured to detect the type of a currently inputted keyboard code;

a notifying module, configured to notify the calculating module to execute a searching and calculating operation, when the currently inputted keyboard code is detected as a character keyboard code; and a deleting module, configured to the word or the term stored in a context database and selected by the lastly inputted keyboard code, when the currently inputted keyboard code is detected as an operation for input interruption control.

Correspondingly, one embodiment of the present disclosure also provides a terminal equipment with an input method, which includes the above device for enabling intelligent association in input method.

Wherein, the receiving module receives the keyboard code inputted by a keyboard.

Wherein, the receiving module receives the keyboard code inputted by a touchscreen.

Wherein, the preset lexicon is set when the input method is established, and during the process of user usage after the installation, according to the input of the user, the preset lexicon completes self study and self update.

Wherein, the terminal equipment scans the user inputted word or term before a cursor.

In one embodiment of the present invention, referring to the lastly inputted word or term by a user, the candidate character corresponding to the currently inputted keyboard code can be searched, and the weight of each candidate character can be updated and determined, and each candidate character can be displayed for the user according to the updated weight. Thus, in this way, the hit rate of character associated with the keyboard code can be efficiently improved, and the input speed of the character from a user can be increased.

BRIEF DESCRIPTION OF THE DRAWINGS

In order to illustrate the embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

Further descriptions of present disclosure will be illustrated clearly and completely, which can be combined with embodiments in drawings and detailed embodiments. Obviously, the embodiments here are not all embodiments but only part of embodiments of present disclosure. Based on the embodiments of present disclosure, under premise of without paying out creative work, other embodiments obtained by the person having ordinary skill in the art are considered to encompass within the scope of the present invention.

Figure 1:
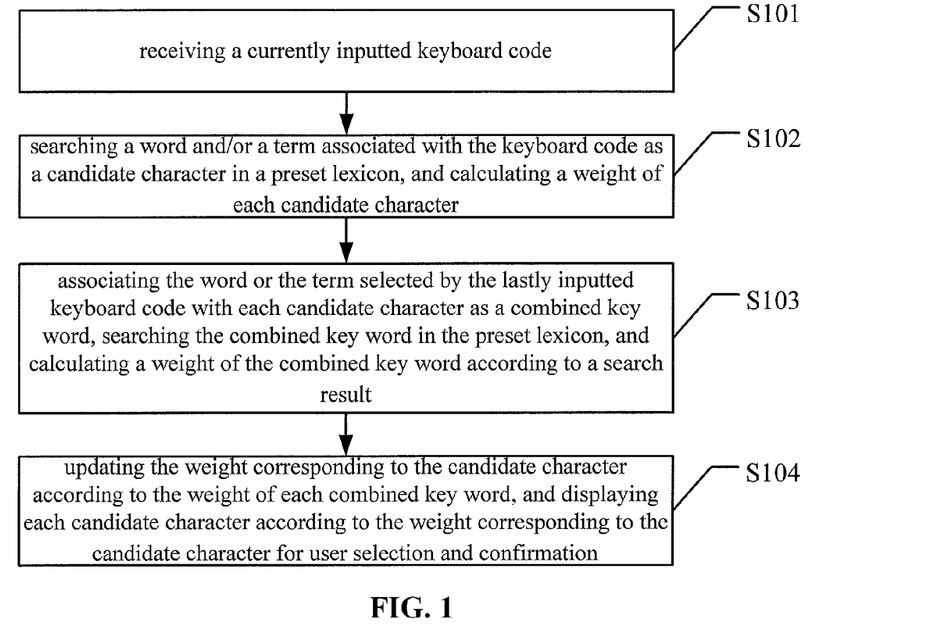
FIG. 1 is a flowchart of a method for enabling intelligent association in input method according to a first embodiment of present disclosure.

Referring to FIG. 1, it is a flowchart of a method for enabling intelligent association in input method according to a first embodiment of present disclosure. Embodiments of the present disclosure can be applied for a mobile phone, a computer or the like devices which can enable an input method. In one embodiment of the present disclosure, according to a lastly inputted word or term, the association can be made for a word or term corresponding to a currently inputted keyboard code, by which the association for the word or the term corresponding to the currently inputted keyboard code can be completed. Specifically, the method can at least include the following steps that start from step S101.

Step S101, receiving a currently inputted keyboard code.

When a character needs to be inputted by a user, a corresponding keyboard code can be inputted through a keyboard or a touchscreen of a mobile phone or a like device. The mobile phone or the like device can receive the corresponding keyboard code in S101.

Step S102, searching a word and/or a term associated with the keyboard code as a candidate character in a preset lexicon, and calculating a weight of each candidate character.

The lexicon has been set when the input method is established, and during the process of installation and use, according to the input of the user, the lexicon can complete automatic learning and update, which means that the lexicon can include basic words or terms, and can also include commonly-used words or terms obtained according to user habit. After the word and/or term which are/is taken as a candidate character can be found, the candidate character can be calculated by a weight algorithm. Specifically, according to the usage frequency of the word or the term recorded in the mobile phone, the corresponding weight can be calculated.

Step S103, associating the word or the term selected by the lastly inputted keyboard code with each candidate character as a combined key word, searching the combined key word in the preset lexicon, and calculating a weight of the combined key word according to a search result.

Each candidate character can be combined with the lastly inputted word or term to form a key word; and the key word can be searched in the lexicon to confirm whether the combined key word exists in the basic words and/or terms, or the commonly-used words and/or terms or not. When the combined key word exists in the basic words and/or terms, or the commonly-used words and/or terms, the weight of a corresponding combined key word can be calculated. Moreover, for the combined key word being searched but not matching a comparative data, the weight of the combined key word can be assigned to a basic value, such as zero.

Step S104, updating the weight corresponding to the candidate character according to the weight of each combined key word, and displaying each candidate character according to the weight corresponding to the candidate character for user selection and confirmation.

Specifically, taken the weight of each candidate character as a basis, on which the weight of the combined key word corresponding to the candidate character can be added to obtain a final weight of the candidate character. According to the final weight, each candidate character can be ranked and displayed for user selection and confirmation.

In one embodiment of the present invention, referring to the lastly inputted word or term by a user, the candidate character corresponding to the currently inputted keyboard code can be searched, and the weight of each candidate character can be updated and determined, and each candidate character can be displayed for the user according to the updated weight. Thus, in this way, the hit rate of character associated with the keyboard code can be efficiently improved, and the input speed of the character from a user can be increased.

Figure 2:
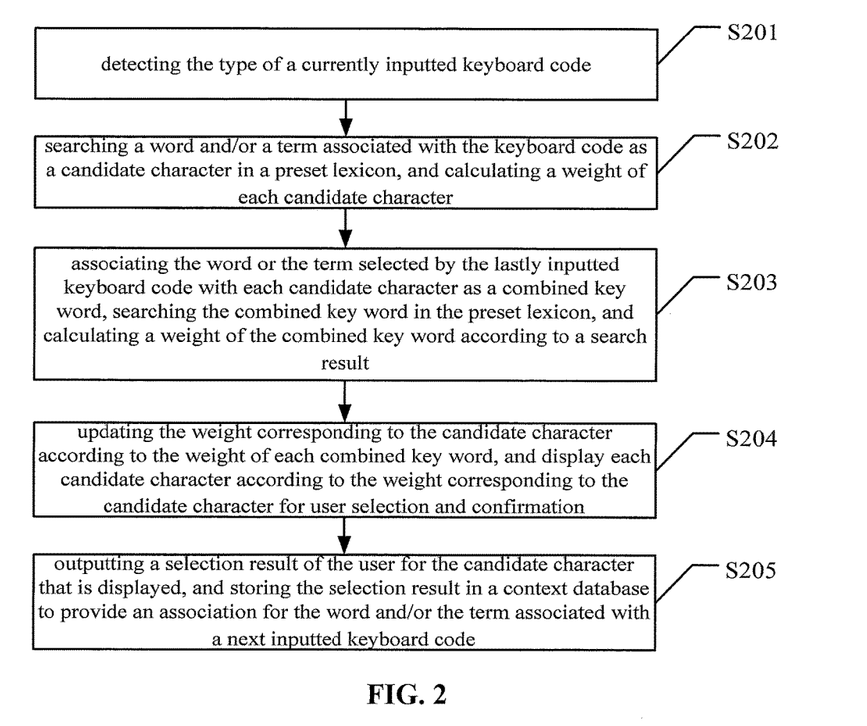
FIG. 2 is a flowchart of a method for enabling intelligent association in input method according to a second embodiment of present disclosure.

Referring to FIG. 2, it is a flowchart of a method for enabling intelligent association in input method according to a second embodiment of present disclosure. Embodiments of the present disclosure can be applied for a mobile phone, a computer or the like devices which can enable an input method. In one embodiment of the present disclosure, according to a lastly inputted word or term, the association can be made for a word or term corresponding to a currently inputted keyboard code, by which the association for the word or the term corresponding to the currently inputted keyboard code can be completed. Specifically, the method can at least include the following steps.

Step S201, detecting the type of a currently inputted keyboard code.

If the currently inputted keyboard code is detected as a character keyboard code, step S202 can be executed.

If the currently inputted keyboard code is detected as an operation for input interruption control, the word or the term stored in a context database and selected by the lastly inputted keyboard code can be deleted, to avoid interrupting the input result of a word or term which is located in a new position.

Specifically, after the user inputs a certain keyboard code and selects a corresponding word or term according to the keyboard code, a context database can be configured to temporarily store the word or the term input by the user, for convenience that the association for the word or term corresponding to the following inputted keyboard code can be completed.

The operation for input interruption control can include but not limited to: the user uses the "backspace key" to delete the lastly inputted word or term, or the user uses a "direction key" to move the "cursor" behind another word or term in a document. At this time, the intelligent association should not be made based on the lastly inputted word or term, and the selected word or term according to the lastly inputted keyboard code stored in the context database needs to be deleted, to avoid interrupting the input result of a word or term which is located in a new position.

It can be sure that in another embodiment of the present disclosure, the user inputted word or term before the "cursor" can be scanned intelligently, for convenience that the intelligent association for the word or term corresponding to the following inputted keyboard code can be completed.

Step S202, searching a word and/or a term associated with the keyboard code as a candidate character in a preset lexicon, and calculating a weight of each candidate character.

The preset lexicon can include: a basic lexicon for storing basic words and/or terms, and a commonly-used lexicon for storing the used words and/or terms in the local. The weight of each candidate character is calculated, which means that the weight of each candidate character can be calculated to be obtained according to the usage frequency of each candidate character.

Step S203, associating the word or the term selected by the lastly inputted keyboard code with the each candidate character as a combined key word, searching the combined key word in the preset lexicon, and calculating a weight of the combined key word according to a search result.

The weight of each combined key word is calculated, which means that the weight of each combined key word being searched and matching a comparative data can be calculated to be obtained according to a usage frequency of the combined key word being searched and matching a comparative data. For the combined key word being searched but not matching a comparative data, the weight of the combined key word can be assigned to a basic value, such as zero.

Step S204, updating the weight corresponding to the candidate character according to the weight of the each combined key word, and displaying each candidate character according to the weight corresponding to the candidate character for user selection and confirmation.

Specifically, taken the weight of each candidate character as a basis, on which the weight of the combined key word corresponding to the candidate character can be added to obtain a final weight of the candidate character. According to the final weight, each candidate character can be ranked and displayed for user selection and confirmation.

Step S205, outputting a selection result of the user for the candidate character that is displayed, and storing the selection result in a context database to provide an association for the word and/or the term associated with a next inputted keyboard code. After the user selects to confirm a certain candidate character, the candidate character selected by the user can be outputted to a corresponding location in the corresponding document.

Figure 3:
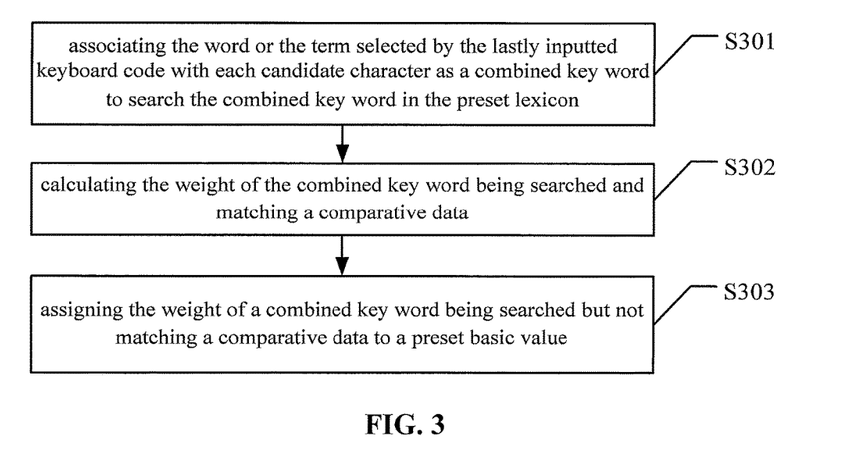
FIG. 3 is a flowchart of a method for calculating the weight of each combined key word according to an embodiment of present disclosure.

Furthermore, referring to FIG. 3, it is a flowchart of a method for calculating the weight of each combined key word according to an embodiment of present disclosure. In one embodiment, the method for calculating the weight of each combined key word can correspond to the step S103 above in the method for enabling intelligent association in input method according to the first embodiment, or correspond to the step S203 above in the method for enabling intelligent association in input method according to the second embodiment. The method for calculating the weight of each combined key word can include the following steps.

Step S301, associating the word or the term selected by the lastly inputted keyboard code with each candidate character as a combined key word to search the combined key word in the preset lexicon.

Step S302, calculating the weight of the combined key word being searched and matching a comparative data.

Step S303, assigning the weight of a combined key word being searched but not matching a comparative data to a preset basic value.

When the word or the term corresponding to the combined key word is found in the lexicon, it means that there exists a matched comparative data. Then, according to the matched data, the usage frequency of the combined key word can be determined, and the weight of the corresponding combined key word can be calculated. For the combined key word being searched but not matching a comparative data, the weight of the combined key word can be assigned to a basic value, such as zero.

Figure 4:
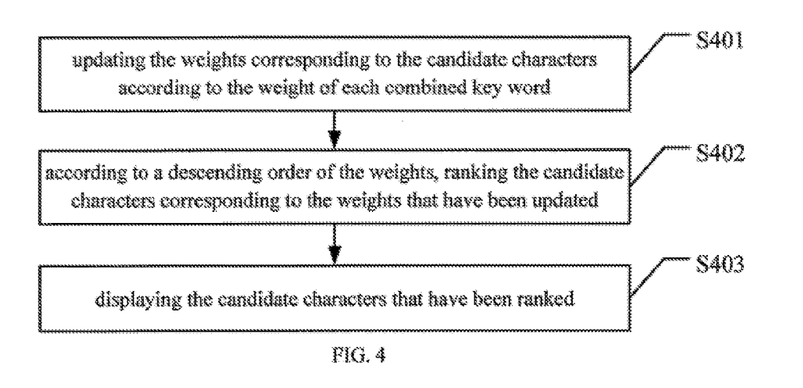
FIG. 4 is a flowchart of a method for displaying the candidate character according to an embodiment of present disclosure.

Referring to FIG. 4, it is a flowchart of one of a method for displaying the candidate character according to an embodiment of the present disclosure. In one embodiment of the present disclosure, the candidate characters can be ranked according to updated weights of the candidate characters, and a rank result can be displayed for the user, which can be corresponding to the step S104 described in the above embodiment. The method in the embodiment of the present disclosure can include the following steps.

Step S401, updating the weights corresponding to the candidate characters according to the weight of the each combined key word. For example, the weight of each combined key word can be added to the weight of a current candidate character, and the weight of each candidate character that has been updated can be obtained.

Step S402, according to a descending order of the weights, ranking the candidate characters corresponding to the weights that have been updated.

Specifically, it can be ranked for the weights in the order from large to small, from left to right, or from top to bottom.

Step S403, displaying the candidate characters that have been ranked.

The method for enabling intelligent association in input method according to one embodiment of the present disclosure can be illustrated by means of an example described as below.

The user inputs a keyboard code of "zaixian" by Pinyin input method; the device such as a mobile phone can receive the keyboard code, and confirm the keyboard code to be a character keyboard code.

The words and/or terms associated with the keyboard code can be searched in an input method lexicon to obtain association words and terms corresponding to "zaixian" including: "1.在线[100]; 2.再现[80]; 3.在先[60]; 5.在[40]". Therein, the value in a bracket can be a calculated weight of a corresponding term according to a usage frequency.

At this time, the user selects the term of "1.在线[100]", and the "在线" can be temporarily stored in the context database.

When the users next inputs a keyboard code of "shipin", words and terms including "1.食品[90]; 2.视频[80]; 3.饰品[70]; 4.诗品[60]; 5.是[50]" associated with the keyboard code can be obtained as the candidate characters when the lexicon is searched. Meanwhile, instead of displaying these candidate characters to the user, the device such as a mobile phone can execute the following steps in the background.

The term of "在线" inputted last time from the user can be combined with each of the candidate characters including "1.食品[90]; 2.视频[80]; 3.饰品[70]; 4.诗品[60]; 5.是[50]", and combined key words of "在线食品" "在线视频 ", "在线饰品", "在线诗品", and "在线是" can be obtained respectively.

The above combined key words can be searched in the lexicon, and "1.在线食品[0]; 2.在线视频[50]; 3.在线饰品[0]; 4.在线诗品[0]; 5.在线是[0]" can be obtained. Wherein, each value in a bracket can be a weight of a corresponding combined key word according to a usage frequency.

According to the weight of each key word, the weight of each candidate character can be updated. The weight of the combined key word can be added to the weight of the candidate character which corresponds to the combined key word, and candidate characters of "1. 食品[90]; 2.视频[130]; 3.饰品[70]; 4.诗品[60]; 5. 是[50]" can be obtained.

The weight of the candidate character corresponding to the combined key word can be updated, and according to updated weight of each candidate character, a list of candidate characters of "1. 视频[130]; 1.食品[90]; 3.饰品[70]; 4.诗品[60]; 5. 是[50]" can be obtained, and each candidate character can be displayed for the user.

Meanwhile, the user can directly select to obtain the "1. 视频[130]" by pressing the space key, and the input of "在线视频" can be completed.

In one embodiment of the present invention, referring to the lastly inputted word or term by a user, the candidate character corresponding to the currently inputted keyboard code can be searched, the weight of each candidate character can be updated and determined, and each candidate character can be displayed for the user according to the weight that has been updated. And thus, the hit rate of character associated with the keyboard code can be efficiently improved, and the input speed of the character from a user can be increased.

When a candidate character is displayed for the user, all the candidate characters can be displayed in a descending order according to the weights that have been updated, to make convenience for the user to browse and select.

Meanwhile, when the user interrupts an input operation, the lastly inputted word or term temporarily stored at last time can be deleted automatically, the operation of subsequent intelligent association can be ended to avoid interrupting the input result of a word or term which is located in a new position, and furthermore, the intelligence and the automation can be realized.

A structure diagram of a device for enabling intelligent association in input method will be illustrated as below.

Figure 5:
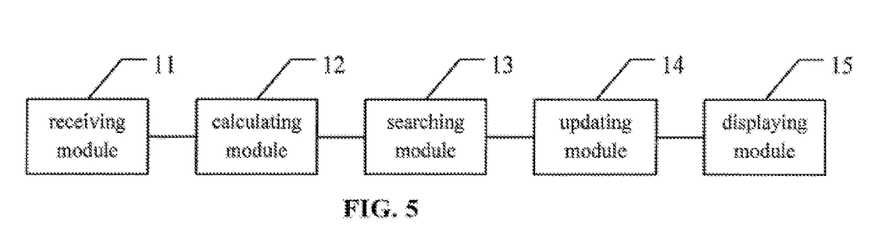
FIG. 5 is a structure diagram of a device for enabling intelligent association in input method according to a first embodiment of present disclosure.

Referring to FIG. 5, it is a structure diagram of a device for enabling intelligent association in input method according to a first embodiment of present disclosure. The device according to an embodiment of the present disclosure can be applied for a mobile phone, a computer or the like devices which can enable an input method. In one embodiment of the present disclosure, according to a lastly inputted word or term, the association can be made for a word or a term corresponding to a currently inputted keyboard code, by which the association for the word or the term corresponding to the currently inputted keyboard code can be completed. Specifically, the device can at least include the following modules.

A receiving module 11, is configured to receive a currently inputted keyboard code.

When a character needs to be inputted by a user, a corresponding keyboard code can be inputted through a keyboard or a touchscreen, etc. The receiving module 11 can receive a corresponding keyboard code. For example, the receiving module 11 can receive a keyboard code of "shipin" inputted by the user.

A calculating module 12, is configured to search a word and/or a term associated with the keyboard code as a candidate character in a preset lexicon, and calculate a weight of each candidate character.

The lexicon has been set when the input method is established, and during the process of installation and use, according to the input of the user, the lexicon can complete automatic learning and update, which means that the lexicon can include basic words or terms, and can also include commonly-used words or terms obtained by user habit. After the word and/or the term which are/is taken as a candidate character can be found, the candidate character can be calculated by a weight algorithm. Specifically, according to the usage frequency of the word or the term recorded in the mobile phone, the corresponding weight can be calculated search a word and/or a term associated with the keyboard code as a candidate character in a preset lexicon, For example, according to the keyboard code of "shipin" received by the receiving module 11, the candidate characters of "1. 食品[90]; 2.视频[80]; 3.饰品 [70]; 4. 诗品[60]; 5. 是[50]" can be searched and obtained in the lexicon by the calculating module 12. Therein, the value in a bracket can be a calculated weight of a corresponding term according to the usage frequency.

A searching module 13, is configured to associate the word or the term selected by the lastly inputted keyboard code with each candidate character as a combined key word, and search the combined key word in the preset lexicon, and calculate a weight of the combined key word according to a search result.

The searching module 13 can combine each candidate character with the lastly inputted word or term to form a key word; and the key word can be searched in the lexicon to confirm whether the combined key word exists in the basic words and/or terms, or commonly-used words and/or terms or not. When combined key word exists in the basic words and/or terms or the commonly-used words and/or terms, the weight of a corresponding combined key word can be calculated. Particularly, for the combined key word being searched but not matching a comparative data, the weight of the combined key word can be assigned to a basic value, such as zero.

For example, a lastly inputted term which is selected by the user can be "在 线", and then the searching module 13 can take "在线食品", "在线视频", "在线饰 品", "在线诗品", and "在线是" as combined key words, and search for associated terms according to the combined key words. During the current search process, the searching module 13 may only obtain one term which is "在线视频" and its usage frequency. According to the search result, the weight of each combined key word can be obtained, such as "1.在线食品[0]; 2. 在线视频[50]; 3.在线饰品[0]; 4.在线诗品 [0]; 5.在线是[0]". Therein, since the combined key words of "在线食品", "在线饰 品", "在线诗品", "在线是" are not found to be used in the database, there is no matched data, so the terms of "在线食品", "在线饰品", "在线诗品", "在线是" can be directly assigned as 0.

An updating module 14, is configured to update the weight corresponding to the candidate character according to the weight of each combined key word.

Specifically, taken the weight of each candidate character as a basis, on which the updating module 14 can add the weight of the combined key word corresponding to the candidate character, and a final weight of the candidate character can be obtained. According to the final weight, each candidate character can be ranked and displayed for user selection and confirmation.

For example, according to the weight of each key word, the weight of each candidate character described above can be updated, and the weight of the combined key word can be added to the weight of the candidate character which corresponds to the combined key word. Thus, candidate characters of "1. 食品[90]; 2.视频[130]; 3. 饰品[70]; 4. 诗品[60]; 5.是[50]" can be obtained.

A displaying module 15, is configured to display each candidate character according to the weight corresponding to the candidate character for user selection and confirmation.

The displaying module 15 can rank each candidate character according to the value of the weight, and display ranked candidate characters for the user to make convenience for the user selection to complete the current character input.

For example, "1.视频[130]; 1.食品[90]; 3.饰品[70]; 4. 诗品[60]; 5.是 [50]" can be displayed in order for user selection.

Moreover, the calculating module 12 can calculate the weight of each candidate character according to the usage frequency of each candidate character.

In one embodiment of the present invention, referring to the lastly inputted word or term by a user, the candidate character corresponding to the currently inputted keyboard code can be searched, and the weight of each candidate character can be updated and determined, and each candidate character can be displayed for the user according to the updated weight. Thus, in this way, the hit rate of character associated with the keyboard code can be efficiently improved, and the input speed the character from a user can be increased.

Figure 6:
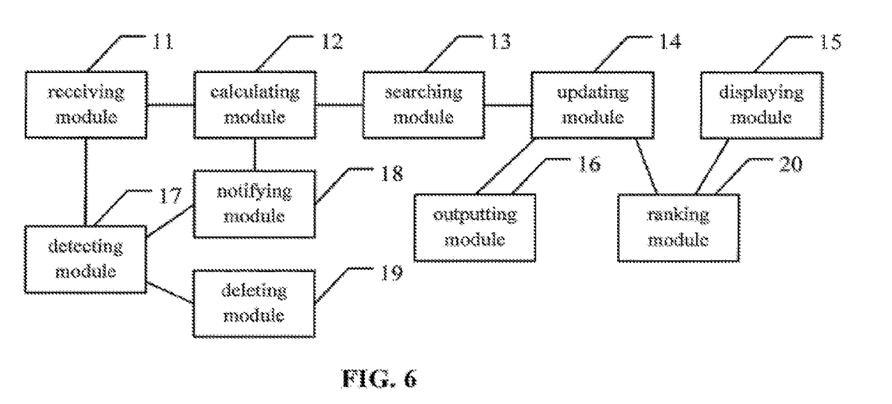
FIG. 6 is a structure diagram of a device for enabling intelligent association in input method according to a second embodiment of present disclosure.

Referring to FIG. 6, it is a structure diagram of a device for enabling intelligent association in input method according to a second embodiment of present disclosure. The device according to an embodiment of the present disclosure can be applied for a mobile phone, a computer or the like devices which can enable an input method. In one embodiment of the present disclosure, according to a lastly inputted word or term, the association can be made for a word or term corresponding to a currently inputted keyboard code, by which the association for the word or the term corresponding to the currently inputted keyboard code can be completed. The device according to one embodiment of the present disclosure can at least include the receiving module 11, the calculating module 12, the searching module 13, the updating module 14 and the displaying module 15 described in the embodiment above. Furthermore, the device can further include the following modules.

An outputting module 16, is configured to output a selection result of the user for the candidate character that is displayed, and store the selection result in a context database to provide an association for the word and/or the term associated with a next inputted keyboard code.

After the user selects to confirm one of candidate characters displayed in the displaying module 14, the candidate character selected by the user can be outputted to a corresponding location in the corresponding document.

Furthermore, in FIG. 6, the device can also include: a detecting module 17, a notifying module 18 and a deleting module 19. By the three modules above, the device can judge the user inputted keyboard code, that whether the receiving module 11, the calculating module 12, the searching module 13, the updating module 14 and the displaying module 15 should be notified to execute a corresponding association operation.

Specifically, the detecting module 17 is configured to detect the type of a currently inputted keyboard code.

The notifying module 18 is configured to notify the calculating module to execute a searching and calculating operation, when the currently inputted keyboard code is detected as a character keyboard code.

The deleting module 19 is configured to delete the word or the term stored in a context database and selected by the lastly inputted keyboard code, when the currently inputted keyboard code is detected as an operation for input interruption control.

Specifically, after the user inputs a certain keyboard code and selects a corresponding word or term according to the keyboard code, a context database can be configured to temporarily store the word or the term input by the user, for convenience that the association for the word or term corresponding to the following inputted keyboard code can be completed. It can be sure that in another embodiment of the present disclosure, the user inputted word or term before the "cursor" can be scanned intelligently, for convenience that the intelligent association for the word or term corresponding to the following inputted keyboard code can be completed.

The operation for input interruption control can include but not limited to: the user uses the "backspace key" to delete the lastly inputted word or term, or the user uses a "direction key" to move the "cursor" behind another word or term in a document. At this time, the intelligent association should not be made based on the lastly inputted word or term, and the selected word or term according to the lastly inputted keyboard code stored in the context database needs to be deleted, to avoid interrupting the input result of a word or term which is located in a new position.

Furthermore, it is optional that the device can also include: a ranking module 20, which is configured to rank the candidate characters corresponding to the weights that have been updated by the updating module, according to a descending order of the weights. According to the weights of the updated candidate characters, the ranking module 20 can rank the candidate characters for the weights in the order from left to right or from top to bottom.

The displaying module 15 can specifically display the candidate characters that have been ranked by the ranking module 20.

Figure 7:
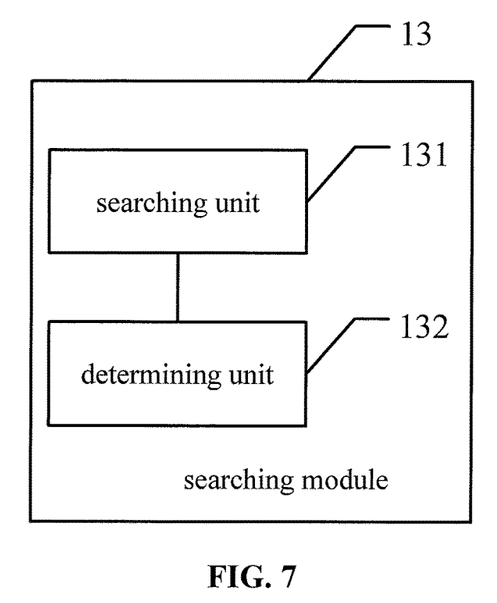
FIG. 7 is a structure diagram of a searching module in FIG. 6.

Referring to FIG. 7, it is a structure diagram of a searching module in FIG. 6. The searching module 13 can further include the following units.

A searching unit 131, is configured to associate the word or the term selected by the lastly inputted keyboard code with the each candidate character as a combined key word to search the combined key word in the preset lexicon.

A determining unit 132, is configured to calculate the weight of the combined key word being searched and matching a comparative data, and assign the weight of a combined key word being searched but not matching a comparative data to a preset basic value.

When the word or the term corresponding to the combined key word is found in the lexicon, it means that there exists a matched comparative data. Then, according to the matched data, the usage frequency of the combined key word can be determined, and the weight of the corresponding combined key word can be calculated. For the combined key word being searched but not matching a comparative data, the weight of the combined key word can be assigned to a basic value, such as zero.

In one embodiment of the present invention, referring to the lastly inputted word or term by a user, the candidate character corresponding to the currently inputted keyboard code can be searched, and the weight of each candidate character can be updated and determined, and each candidate character can be displayed for the user according to the updated weight. Therefore, the hit rate of character associated with the keyboard code can be efficiently improved, and the input speed of the character from a user can be increased.

When a candidate character is displayed for the user, all the candidate characters can be displayed in a descending order according to the weights that have been updated, to make convenience for the user to browse and select.

Meanwhile, when the user interrupts an input operation, the lastly inputted word or term temporarily stored at last time can be deleted automatically, the operation of subsequent intelligent association can be ended to avoid interrupting the input result of a word or term which is located in a new position, and furthermore, the intelligence and the automation can be realized.

According to one embodiment of the present disclosure, the method for enabling intelligent association in input method as shown in FIG. 1 can be executed by corresponding units in the device for enabling intelligent association in input method as shown in FIG. 5. For example, the steps S101-S105 as shown in FIG. 1 can be executed by the receiving module 11, the calculating module 12, the searching module 13 and the updating module 14 as shown in FIG. 5.

According to another embodiment of the present disclosure, each unit in the device as shown in FIG. 5 can be separately or all combined into one or a plurality of other units, or a certain (some) unit(s) can be divided into multiple units in functions. For example, but not limited to, the calculating module 12 can be combined with the searching module 13 to form a single calculating module; the updating module 14 can be combined with the displaying module 15 to form a single updating module, etc., which can also realize the same operation and function, without affecting the technical effect realized by embodiments of the present disclosure.

According to the second embodiment of the present disclosure, the method for enabling intelligent association in input method as shown in FIG. 2 can be executed by corresponding units of the device as shown in FIGS. 6-7. For example, the steps S201, S205, S301, S402, and S403 as shown in FIG. 2 can be executed by the detecting module 17, the outputting module 16, the searching unit 131, the ordering module 20, and the displaying module 15 as shown in FIGS. 6-7.

According to yet another embodiment of the present disclosure, each unit in the device as shown in FIGS. 6-7 can be separately or all combined into one or a plurality of other units, or a certain (some) unit(s) can be divided into multiple units in functions. For example, but not limited to, the detecting module 17 can be combined with the notifying module 18, the deleting module 17 to form a single judging module, the searching unit can be combined with the determining unit 132 to form a single assigning module, etc., which can also realize the same operation and function, but without affecting the technical effect realized by one embodiment of the present disclosure.

It should be understood that, for a person having ordinary skills in the art, parts or whole of the processes in the methods for enabling intelligent association in input method as shown in FIGS. 1-2 may be implemented by a computer program instructing relevant hardware for enabling intelligent association in input method as shown in FIGS. 5-7. The program may be stored in a computer readable storage medium. When executed, the program may execute processes in the above-mentioned embodiments of methods. The storage medium may be but not limited to a magnetic disk, an optical disk, a Read-Only Memory (ROM), a Random Access Memory (RAM), et al.

In conclusion, in an application of the method and the device for enabling intelligent association in input method of the above embodiments, the hit rate of character associated with the keyboard code can be efficiently improved, and the input speed of the character from a user can be increased.

The above descriptions are some embodiments of the invention, and should not be regarded as limitation to the scope of related claims. A person having ordinary skills in a relevant technical field will be able to make improvements and modifications within the spirit of the principle of the invention. The improvements and modifications should also be incorporated in the scope of the claims attached below.

What is claimed is:

1. A method for enabling intelligent association in an input method, the method comprising:
receiving a first inputted keyboard code during a first time period;
searching for at least one first candidate character, using the first inputted keyboard code, to generate at least one found first candidate character;
receiving a selection of a first character from the at least one found first candidate character associated with the first inputted keyboard code;
receiving a second inputted keyboard code during a second time period after the first time period;
searching for at least one second candidate character, using the second inputted keyboard code without the selected first character, to generate at least one found second candidate character associated with the second inputted keyboard code;
calculating a weight of each of the at least one found second candidate character associated with the second inputted keyboard code;
combining the selected first character with each of the at least one found second candidate character associated with the second inputted keyboard code, to respectively generate at least one combined key word;
searching for the at least one combined key word;
calculating a weight of each of the at least one combined key word;
adding the weight of each of the at least one found second candidate character associated with the second inputted keyboard code respectively to the weight of each of the at least one combined key word; and
displaying the at least one found second candidate character associated with the second inputted keyboard code, based on the weight of each of the at least one found second candidate character associated with the second inputted keyboard code respectively added to the weight of each of the at least one combined key word.

2. The method according to claim 1, wherein the searching for the at least one combined key word comprises searching for the at least one combined key word in a preset lexicon, and
the calculating of the weight of each of the at least one combined key word comprises:
calculating a weight of a combined key word matching a comparative data among the preset lexicon; and
assigning a weight of a combined key word not matching a comparative data among the preset lexicon, to a preset basic value.

3. The method according to claim 1, wherein the weight of each of the at least one found second candidate character is calculated according to a usage frequency of each of the at least one found second candidate character, and
the weight of each of the at least one combined key word is calculated according to a usage frequency of each of the at least one combined key word.

4. The method according to claim 1, further comprising ranking the at least one found second candidate character in descending order of the weight of each of the at least one found second candidate character associated with the second inputted keyboard code respectively added to the weight of each of the at least one combined key word,
wherein the displaying of the at least one found second candidate character comprises displaying the at least one found second candidate character that is ranked.

5. The method according to claim 4, further comprising:
receiving a selection of a second character from the at least one found second candidate character that is displayed;
outputting the selected second character storing the selected second character in a context database.

6. The method according to claim 5, wherein the first inputted keyboard code and the second inputted keyboard code are character keyboard codes.

7. The method according to claim 6, further comprising temporarily storing the second inputted keyboard code in the context database.

8. The method according to claim 6, wherein the receiving of the second inputted keyboard code comprises scanning characters that are displayed immediately before a cursor.

9. The method according to claim 1, further comprising:
storing the selected first character in a context database in response to the selection of the first character being received;
detecting a type of the second inputted keyboard code in response to the second inputted keyboard code being received; and
deleting the stored first character from the context database in response to an operation for input interruption control being detected as the type of the second inputted keyboard code.

10. A device for enabling intelligent association in an input method, the device comprising:
a memory storing a series of instructions; and
a processor configured to perform the series of instructions to:
receive a first inputted keyboard code through a keyboard or a touch screen, during a first time period;
search for at least one first candidate character, using the first inputted keyboard code, to generate at least one found first candidate character associated with the first inputted keyboard code;
receive a selection of a first character from the at least one found first candidate character associated with the first inputted keyboard code;
receive a second inputted keyboard code during a second time period after the first time period;
search for at least one second candidate character, using the second inputted keyboard code without the selected first character, to generate at least one found second candidate character associated with the second inputted keyboard code;
calculate a weight of each of the at least one found second candidate character associated with the second inputted keyboard code;
combine the selected first character with each of the at least one found second candidate character associated with the second inputted keyboard code, to respectively generate at least one combined key word;
search for the at least one combined key word;
calculate a weight of each of the at least one combined key word;
adding the weight of each of the at least one second candidate character associated with the second inputted keyboard code respectively to the weight of each of the at least one combined key word; and
display the at least one found second candidate character associated with the second inputted keyboard code, based on the weight of each of the at least one found second candidate character associated with the second inputted keyboard code respectively added to the weight of each of the at least one combined key word.

11. The device according to claim 10, wherein the processor is further configured to perform the instructions to:

search for the at least one combined key word in a preset lexicon;
calculate a weight of a combined key word matching a comparative data among the preset lexicon; and
assign weight of a combined key word not matching a comparative data among the preset lexicon, to a preset basic value.

12. The device according to claim 11, wherein the weight of each of the at least one found second candidate character is calculated according to a usage frequency of each of the at least one found second candidate character, and
the weight of each of the at least one combined key word is calculated according to a usage frequency of each of the at least one combined key word.

13. The device according to claim 12, wherein the processor is further configured to perform the series of instructions to:
rank the at least one found second candidate character in descending order of the weight of each of the at least one found second candidate character associated with the second inputted keyboard code respectively added to the weight of each of the at least one combined key word; and
display the at least one found second candidate character that is ranked.

14. The device according to claim 13, wherein the processor is further configured to perform the series of instructions to:
receive a selection of a second character from the at least one found second candidate character that is displayed;
output the selected second character; and
store the selected second character.

15. The device according to claim 14, wherein the first inputted keyboard code and the second inputted keyboard code are character keyboard codes.

16. A terminal comprising a device for enabling intelligent association in an input method, and the device comprising:
a processor; and
a memory coupled to the processor, the memory storing software units executable by the processor, the software units comprising:
a receiving module configured to receive a first inputted keyboard code during a first time period and a second inputted keyboard code during a second time period after the first time period;
a searching module configured to search for at least one first candidate character, using the first inputted keyboard code, from a preset lexicon, to generate at least one found first candidate character associated with the first inputted keyboard code, and search for at least one second candidate character using the second inputted keyboard code without the selected first character, from the preset lexicon, to generate at least one found second candidate character associated with the second inputted keyboard code,
the receiving module being further configured to receive a selection of a first character from the at least one found first candidate character associated with the first inputted keyboard code;
a calculating module configured to calculate a weight of each of the at least one found second candidate character associated with the second inputted keyboard code,
the searching module being further configured to combine the selected first character with each of the at least one found second candidate character associated with the second inputted keyboard code, to respectively generate at least one combined key word, and search for the at least one combined key word, and the calculating module being further configured to calculate a weight of each of the at least one combined key word;

an updating module configured to add the weight of each of the at least one found second candidate character associated with the second inputted keyboard code respectively to the weight of each of the at least one combined key word; and a displaying module configured to display the at least one found second candidate character, based on the weight of each of the at least one found second candidate character associated with the second inputted keyboard code respectively added to the weight of each of the at least one combined key word.

17. The terminal according to claim 16, wherein the receiving module is further configured to receive either one or both of the first inputted keyboard code and the second inputted keyboard code through a keyboard.

18. The terminal according to claim 16, wherein the receiving module is further configured to receive either one or both of the first inputted keyboard code and the second inputted keyboard code through a touch screen.

19. The terminal according to claim 16, wherein the preset lexicon is established when the input method is installed to the terminal, and is configured to be self-studied and self-updated during usage.

20. The terminal according to claim 16, wherein the terminal is configured to scan characters that are displayed immediately before a cursor.

* * * * *